United States Patent
Kaneko et al.

(10) Patent No.: US 12,141,632 B2
(45) Date of Patent: Nov. 12, 2024

(54) PRINTER CONTROL SYSTEM, PRINTING SYSTEM, PRINTING DATA CREATION METHOD, AND PRINTING METHOD

(71) Applicant: MIMAKI ENGINEERING CO., LTD., Nagano (JP)

(72) Inventors: Satoshi Kaneko, Nagano (JP); Kimiaki Nakaya, Nagano (JP)

(73) Assignee: MIMAKI ENGINEERING CO., LTD., Nagano (JP)

( * ) Notice: Subject to any disclaimer, the term of this patent is extended or adjusted under 35 U.S.C. 154(b) by 589 days.

(21) Appl. No.: 17/431,175

(22) PCT Filed: Jan. 21, 2020

(86) PCT No.: PCT/JP2020/001873
§ 371 (c)(1),
(2) Date: Aug. 16, 2021

(87) PCT Pub. No.: WO2020/170693
PCT Pub. Date: Aug. 27, 2020

(65) Prior Publication Data
US 2022/0147779 A1 May 12, 2022

(30) Foreign Application Priority Data

Feb. 18, 2019 (JP) .................................. 2019-026305
Feb. 18, 2019 (JP) .................................. 2019-026306

(51) Int. Cl.
*G06K 15/02* (2006.01)
*B29C 64/112* (2017.01)
(Continued)

(52) U.S. Cl.
CPC ........ *G06K 15/1848* (2013.01); *B29C 64/112* (2017.08); *B29C 64/393* (2017.08);
(Continued)

(58) Field of Classification Search
CPC ............ G06K 15/1848; G06K 15/102; G06K 15/1825; G06K 15/1823; B33Y 10/00;
(Continued)

(56) References Cited

U.S. PATENT DOCUMENTS

| 2009/0231617 A1* | 9/2009 | Imai ...................... B41J 19/147 358/1.15 |
| 2019/0184716 A1* | 6/2019 | Totsuka ................ B29C 64/112 |

FOREIGN PATENT DOCUMENTS

| JP | 2001301267 | 10/2001 |
| JP | 2005032144 | 2/2005 |

(Continued)

OTHER PUBLICATIONS

Office Action of China Counterpart Application, with English translation thereof, issued on Apr. 21, 2022, pp. 1-15.
(Continued)

*Primary Examiner* — Quang N Vo
(74) *Attorney, Agent, or Firm* — JCIPRNET

(57) ABSTRACT

A printer control system for controlling an inkjet printer that prints an image having a predetermined thickness on a print medium includes: an image data creating/editing portion, configured for creating and editing an image data; and a printer control portion, configured for converting the image data sent from the image data creating/editing portion into a printing data and sending the printing data to the inkjet printer. When a portion for allowing the image to have a thickness in the image printed on the print medium is defined as a thick portion, the image data sent from the image data creating/editing portion to the printer control portion includes at least one of: a thickness information regarding a thickness of the thick portion, and a shape information regarding a shape of an end portion of the thick portion.

15 Claims, 5 Drawing Sheets

(51) Int. Cl.
  *B29C 64/393* (2017.01)
  *B33Y 10/00* (2015.01)
  *B33Y 30/00* (2015.01)
  *B33Y 50/02* (2015.01)
  *B41J 2/21* (2006.01)
  *G06K 15/10* (2006.01)

(52) U.S. Cl.
  CPC ............... *B33Y 10/00* (2014.12); *B33Y 30/00* (2014.12); *B33Y 50/02* (2014.12); *B41J 2/2114* (2013.01); *G06K 15/102* (2013.01); *G06K 15/1825* (2013.01); *G06K 15/1823* (2013.01)

(58) Field of Classification Search
  CPC ....... B33Y 30/00; B33Y 50/02; B29C 64/112; B29C 64/393; B41J 2/2114
  See application file for complete search history.

(56) References Cited

FOREIGN PATENT DOCUMENTS

| | | |
|---|---|---|
| JP | 2012106473 | 6/2012 |
| JP | 2013159470 | 8/2013 |

OTHER PUBLICATIONS

"International Search Report (Form PCT/ISA/210) of PCT/JP2020/001873," mailed on Mar. 24, 2020, with English translation thereof, pp. 1-4.

* cited by examiner

PRINTER CONTROL SYSTEM, PRINTING SYSTEM, PRINTING DATA CREATION METHOD, AND PRINTING METHOD

CROSS-REFERENCE TO RELATED APPLICATION

This application is a 371 application of the international PCT application serial no. PCT/JP2020/001873, filed on Jan. 21, 2020, which claims the priority benefits of Japan application no. 2019-026305, filed on Feb. 18, 2019, and Japan application no. 2019-026306, filed on Feb. 18, 2019. The entirety of each of the above-mentioned patent applications is hereby incorporated by reference herein and made a part of this specification.

TECHNICAL FIELD

The present invention relates to a printer control system for controlling a printer that prints an image having a predetermined thickness on a print medium, and a printing system including the printer control system. The present invention also relates to a printing data creation method for printing an image having a predetermined thickness on a print medium. Note that, in the present specification, the "image" includes a symbol including a character, a figure, and a combination of the symbol and the figure.

BACKGROUND ART

Conventionally, an inkjet printer that prints an image having a predetermined thickness on a print medium (that is, thick printing is performed) is known (for example, refer to Patent Literature 1). The inkjet printer described in Patent Literature 1 includes an inkjet head that ejects ultraviolet-curable ink droplets, an ultraviolet irradiating device that irradiates the ink ejected to a print medium with ultraviolet light, and a carriage on which the inkjet head and the ultraviolet irradiating device are mounted. In the inkjet printer described in Patent Literature 1, the thick printing is performed on the print medium by sequentially stacking a plurality of ink layers formed by a clear ink on an ink layer formed by a color ink.

CITATION LIST

Patent Literature

Patent Literature 1: Japanese Unexamined Patent Publication No. 2012-106473

SUMMARY OF INVENTION

Technical Problems

The inkjet printer described in Patent Literature 1 is connected to, for example, a personal computer in which image editing software for creating and editing data (image data) of an image to be printed on the print medium and a software raster image processor (RIP) for converting the image data into data for printing (printing data) are installed. When the thick printing is performed by the inkjet printer described in Patent Literature 1, for example, first, image data created in advance is read by the image editing software.

For example, in a case where a portion allowing the image to have a thickness in the image to be printed on the print medium is formed by ten ink layers of the clear ink, the image data read by the image editing software is sent 10 times from the image editing software to the software RIP in order to create printing data of this portion. When the image data is sent from the image editing software to the software RIP, an operator performs a predetermined operation of superposing and synthesizing the image data sent over 10 times and adjusting a shape of the synthesized image data by using the software RIP, and converts the image data sent over 10 times into printing data of the portion allowing the image to have a thickness. When the printing data is created, the printing data is sent to the inkjet printer, and the inkjet printer performs thick printing on the print medium based on the printing data.

However, in the conventional case, since the operation performed by the operator using the software RIP when performing the thick printing on the print medium is relatively complicated, a burden of an operator's operation when converting the image data into the printing data increases.

Therefore, the present invention provides a printer control system for controlling an inkjet printer that prints an image having a predetermined thickness on a print medium, the printer control system being capable of reducing a burden of an operator's operation when converting image data into printing data. The present invention provides a printing system including the printer control system. Furthermore, the present invention provides a printing data creation method for printing an image having a predetermined thickness on a print medium, the printing data creation method being capable of reducing a burden of an operator's operation when converting image data into printing data.

Solutions to Problems

In order to solve the above problems, the printer control system of the present invention is a system for controlling an inkjet printer that prints an image having a predetermined thickness on a print medium. The printer control system includes: an image data creating/editing portion, configured for creating and editing an image data that is a data of an image; and a printer control portion, configured for converting the image data sent from the image data creating/editing portion into a printing data and sending the printing data to the inkjet printer. In the image having a predetermined thickness, a portion for allowing the image to have a thickness is defined as a thick portion. The image data sent from the image data creating/editing portion to the printer control portion includes at least one of: a thickness information regarding a thickness of the thick portion, and a shape information regarding a shape of an end portion of the thick portion.

In the printer control system of the present invention, the image data sent from the image data creating/editing portion to the printer control portion includes at least one of: the thickness information regarding the thickness of the thick portion, and the shape information regarding the shape of the end portion of the thick portion. Therefore, in the present invention, when converting the image data into printing data in the printer control portion, the operator does not need to perform any one of an operation of adding the thickness information to the printing data or an operation of adding the shape information to the printing data. Accordingly, in the present invention, it is possible to reduce the burden of the operator's operation when converting the image data into the printing data.

In the present invention, a spot color is applied to the image data, and at least one of the thickness information and the shape information, which are included in the image data, is preferably specified by the spot color. In this configuration, the thickness information and the shape information can be relatively easily included in the image data.

In the present invention, the image data preferably includes both the thickness information and the shape information. In this configuration, it is possible to further reduce the burden of the operator's operation when converting the image data into the printing data.

In the present invention, the thick portion includes a plurality of ink layers that are stacked, and for example, the thickness information is the number of the ink layers constituting the thick portion or the thickness of the thick portion. In the present invention, for example, the thick portion is composed of the ink layers of white ink or clear ink.

The printer control system of the present invention can be used in the printing system including the inkjet printer that prints the image on the print medium. In the printing system, the inkjet printer prints the image on the print medium based on the printing data sent from the printer control portion. In the printing system, it is possible to reduce the burden of the operator's operation when converting the image data into the printing data.

The inventor of the present application has found that by devising the order of stacking the ink layers when stacking a plurality of the ink layers constituting the thick portion, it is possible to prevent a generation of a protrusion at an upper end of an end surface of the thick portion and to form the thick portion into a desired shape.

The printing system of the present invention is based on such new knowledge. The thick portion is composed of a plurality of the ink layers that are stacked, and the end surface of the thick portion is inclined so that a width of the thick portion increases as being directed toward a lower side, and an upper end of the end surface of the thick portion has an R shape, or the thick portion is formed in a dome shape. In a case where each layer obtained when the thick portion is sliced in a horizontal direction with the same number of layers as the number of the ink layers constituting the thick portion is a temporary ink layer, when the inkjet printer prints the image on the print medium, the printer control portion creates a plurality of ink layer printing data for printing each of a plurality of the temporary ink layers, and causes the inkjet printer to print and stack the temporary ink layers in order from the temporary ink layer of an uppermost layer to the temporary ink layer of a lowermost layer. Therefore, according to the study of the inventor of the prevent application, in the prevent invention, the thick portion is formed in the dome shape, and even when the end surface of the thick portion is inclined so that the width of the thick portion increases as being directed toward the lower side and the upper end of the end surface of the thick portion has an R shape, it is possible to prevent the protrusion at the upper end of the end surface of the thick portion from being generated and form the thick portion to have a desired shape.

In the printing system of the present invention, the temporary ink layers are formed so that the width in the horizontal direction becomes narrower as being directed from the temporary ink layer of the lowermost layer toward the temporary ink layer of the uppermost layer. In this configuration, when the temporary ink layers are printed on the print medium, opposite end portions of the temporary ink layers on the lowermost layer side having a wide width hang down toward the lower side, and are stacked so as to cover the temporary ink layer on the uppermost layer side having a narrow width. Therefore, the thick portion can be formed to have a desired shape while preventing the protrusion from being generated.

In order to solve the above problems, the present invention provides a printing data creation method for creating a printing data for printing an image having a predetermined thickness on a print medium, in which, in the image having a predetermined thickness, a portion for allowing the image to have a thickness is defined as a thick portion, and the printing data is created by converting the image data that is a data of the image including at least one of: a thickness information regarding a thickness of the thick portion, and a shape information regarding a shape of an end portion of the thick portion.

In the printing data creation method of the present invention, the printing data is created by converting the image data including at least one of the thickness information regarding the thickness of the thick portion and the shape information regarding the shape of the end portion of the thick portion. Therefore, in the present invention, when converting the image data into the printing data, the operator does not need to perform any one of an operation of adding the thickness information to the printing data or an operation of adding the shape information to the printing data. Accordingly, when the printing data is created in the printing data creation method of the present invention, it is possible to reduce the burden of the operator's operation when converting the image data into the printing data.

The printing method of the present invention is a method for printing an image having a predetermined thickness on a print medium according to the printing data created by the printing data creation method. In the printing method of the present invention, the thick portion is composed of a plurality of ink layers that are stacked, and an end surface of the thick portion is inclined so that a width of the thick portion increases as being directed toward a lower side, and an upper end of the end surface of the thick portion has an R shape, or the thick portion is formed in a dome shape. In a case where each layer obtained when the thick portion is sliced in a horizontal direction with the same number of layers as the number of the ink layers constituting the thick portion is a temporary ink layer, when the image is printed on the print medium, a plurality of the ink layer printing data for printing each of a plurality of the temporary ink layers are created as the printing data, and the inkjet printer prints and stacks the temporary ink layers on the print medium in order from the temporary ink layer of an uppermost layer to the temporary ink layer of a lowermost layer.

In the printing method of the present invention, in a case where each layer obtained when the thick portion is sliced in a horizontal direction with the same number of layers as the number of the ink layers constituting the thick portion is a temporary ink layer, when the image is printed on the print medium, a plurality of the ink layer printing data for printing each of a plurality of the temporary ink layers are created, and the inkjet printer prints and stacks the temporary ink layers on the print medium in order from the temporary ink layer of the uppermost layer to the temporary ink layer of the lowermost layer. Therefore, according to the study of the inventor of the prevent application, when the thick portion is formed by the printing method of the prevent invention, the thick portion is formed in the dome shape, and even when the end surface of the thick portion is inclined so that the width of the thick portion increases as being directed toward the lower side and the upper end of the end surface of the thick portion has an R shape, it is possible to prevent the protrusion at the upper end of the end surface of the thick portion from being generated and form the thick portion to have a desired shape.

Effect of the Invention

As described above, in the present invention, in the printer control system for controlling the inkjet printer that prints the image having a predetermined thickness on the print medium, it is possible to reduce a burden of the operator's operation when converting the image data into the printing data. When the printing data is created in the printing data creation method of the present invention, it is possible to reduce the burden of the operator's operation when converting the image data into the printing data.

DESCRIPTION OF EMBODIMENTS

Hereinafter, embodiments of the present invention will be described with reference to the drawings.
(Configuration and Operation of Printing System)

Figure 1:
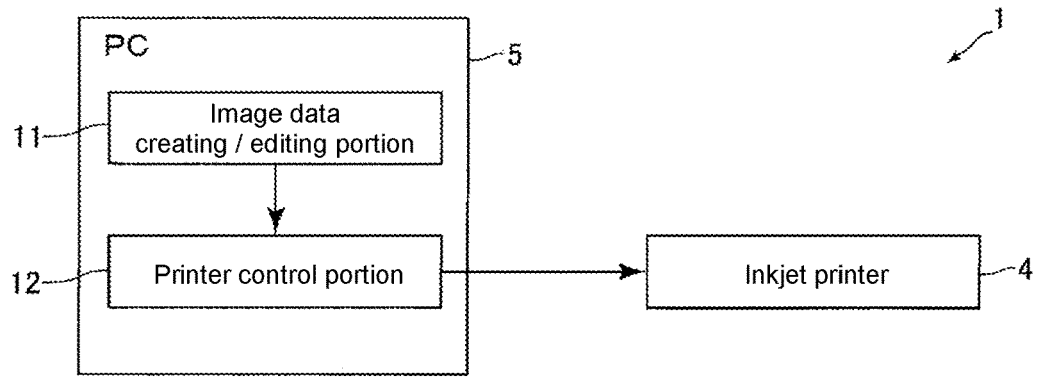
FIG. 1 is a block diagram for describing a configuration of a printing system according to an embodiment of the present invention.
Figure 2:
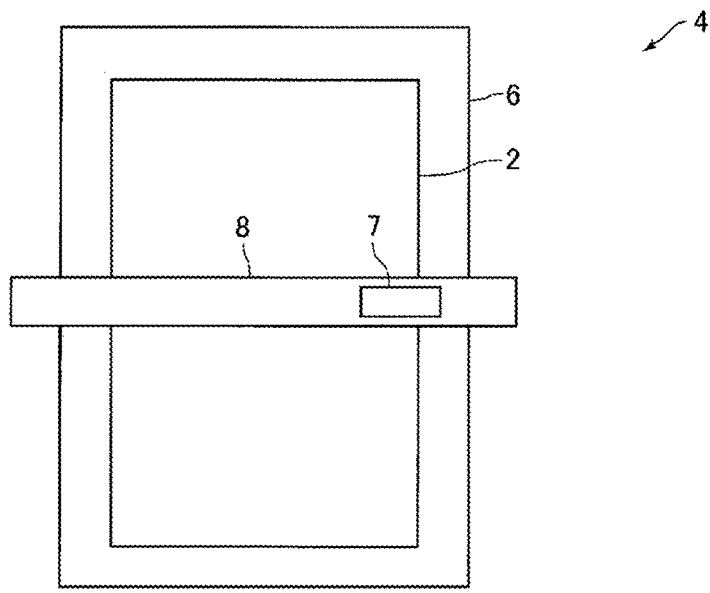
FIG. 2 is a schematic plan view of an inkjet printer illustrated in FIG. 1.
Figure 3:
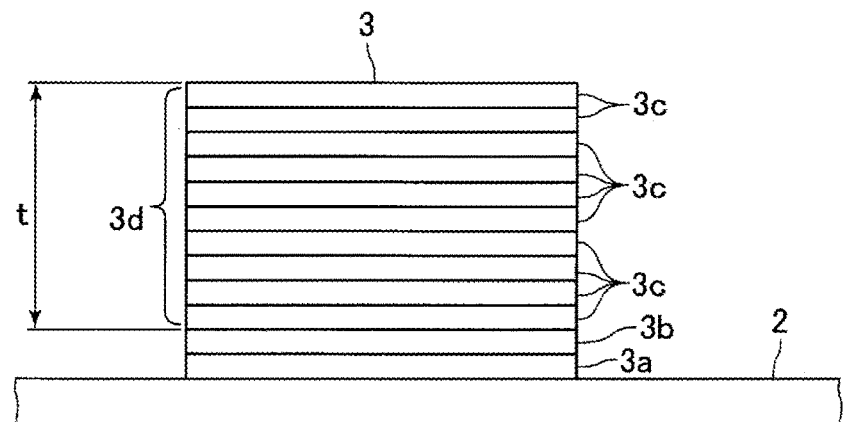
FIG. 3 is a diagram for describing a cross section of an image printed on a print medium by the inkjet printer illustrated in FIG. 1.
Figure 4:
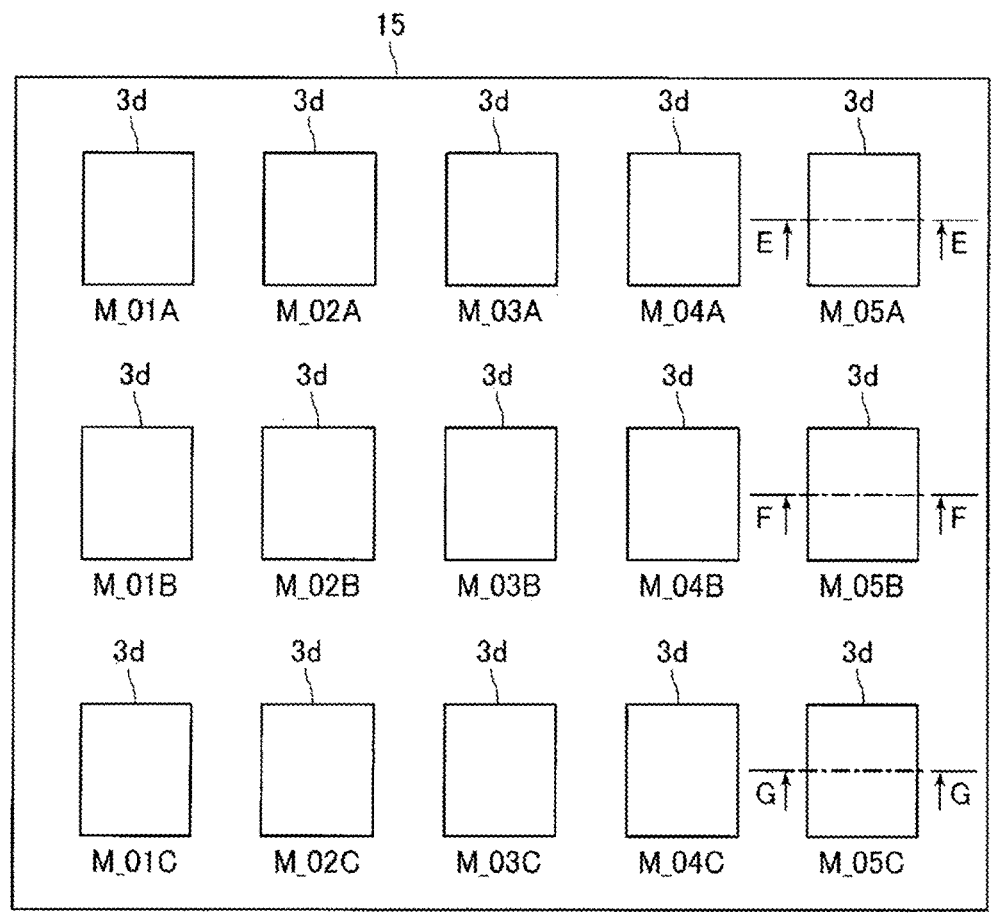
FIG. 4 is a plan view of a patch including sample images of a plurality of thick portions printed in advance by the inkjet printer illustrated in FIG. 1.
Figure 5:
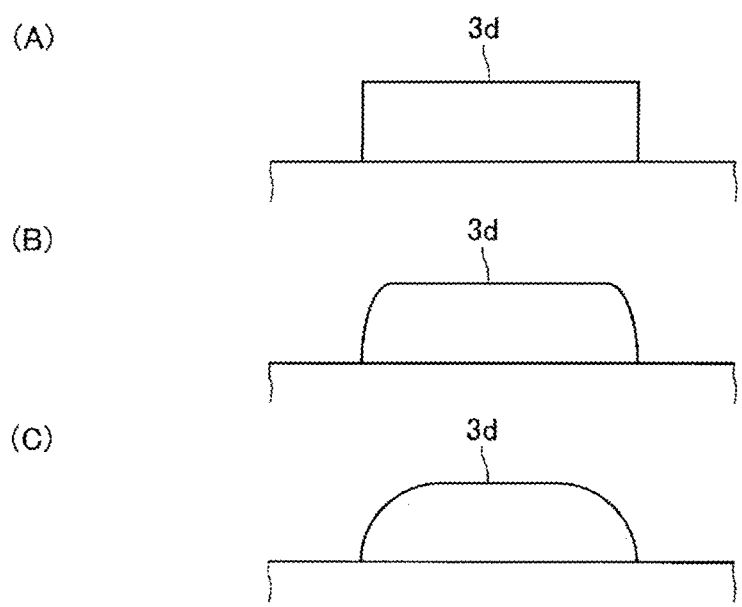
In FIG. 5, (A) is a cross-sectional view taken along line E-E in FIG. 4, (B) is a cross-sectional view taken along line F-F in FIG. 4, and (C) is a cross-sectional view taken along line G-G in FIG. 4.

FIG. 1 is a block diagram for describing a configuration of a printing system 1 according to an embodiment of the present invention. FIG. 2 is a schematic plan view of an inkjet printer 4 illustrated in FIG. 1. FIG. 3 is a diagram for describing a cross section of an image 3 printed on a print medium 2 by the inkjet printer 4 illustrated in FIG. 1. FIG. 4 is a plan view of a patch 15 including sample images of a plurality of thick portions 3d printed in advance by the inkjet printer 4 illustrated in FIG. 1. In FIG. 5, (A) is a cross-sectional view taken along line E-E in FIG. 4, (B) is a cross-sectional view taken along line F-F in FIG. 4, and (C) is a cross-sectional view taken along line G-G in FIG. 4.

The printing system 1 of the embodiment includes the inkjet printer 4 that prints the image 3 having a predetermined thickness on the print medium 2 such as printing paper or a resin plate (that is, thick printing is performed on the print medium 2), and a printer control system 5 for controlling the inkjet printer 4. The printer control system 5 of the embodiment is a personal computer (PC). Therefore, hereinafter, the printer control system 5 is referred to as a "PC 5". Hereinafter, the inkjet printer 4 is referred to as a "printer 4".

The printer 4 includes a table 6 on which the print medium 2 is placed, an inkjet head that ejects ink droplets toward the print medium 2 placed on the table 6, a carriage 7 on which the inkjet head is mounted, a Y bar 8 that holds the carriage 7 so as to be movable in a main scanning direction, a carriage driving mechanism that moves the carriage 7 in the main scanning direction, and a Y bar drive mechanism that moves the Y bar 8 in a sub scanning direction. The carriage 7 is disposed above the table 6. The inkjet head of the embodiment ejects ultraviolet-curable ink. The printer 4 includes an ultraviolet irradiator that irradiates the ink ejected from the inkjet head with ultraviolet light. The ultraviolet irradiator is mounted on the carriage 7.

In the printer 4, an ink layer formed by the ink ejected from the inkjet head and cured by the ultraviolet light radiated from the ultraviolet irradiator is sequentially stacked on an upper surface of the print medium 2, and the image 3 having a predetermined thickness is printed on the print medium 2. That is, the image 3 is formed by a plurality of ink layers that are stacked. The image 3 includes a primer ink layer 3a that is a layer of primer ink, a color ink layer 3b that is a layer of color ink, and a clear ink layer 3c that is a layer of clear ink.

Specifically, the image 3 includes one primer ink layer 3a, one color ink layer 3b, and a plurality of the clear ink layers 3c. In the image 3, the primer ink layer 3a, the color ink layer 3b, and a plurality of the clear ink layers 3c are stacked in this order from a lower side. In the embodiment, a plurality of the stacked clear ink layers 3c in the image 3 forms a thick portion 3d which is a portion for allowing the image 3 to have a thickness in the image 3 having a predetermined thickness. That is, the thick portion 3d is composed of a plurality of the stacked clear ink layers 3c (ink layers of the clear ink).

The PC 5 includes various hardware such as storage means such as a ROM, a RAM and a hard disk drive, and calculation means such as a CPU. In the PC 5, software (image editing software) for creating and editing image data which is data of the image 3 to be printed on the print medium 2, and software (software RIP) for controlling the printer 4 are installed. The image editing software is, for example, an illustrator manufactured by ADOBE SYSTEMS INCORPORATED.

The PC 5 includes, as functions of the PC 5, an image data creating/editing portion 11 for creating and editing image data, and a printer control portion 12 for converting the image data sent from the image data creating/editing portion 11 into printing data and sending the printing data to the printer 4. The image data creating/editing portion 11 includes image editing software and hardware of the PC 5 that executes a program of this software. The printer control portion 12 includes the software RIP and the hardware of the PC 5 that executes the program of the software.

When performing the thick printing on the print medium 2 by using the printer 4, the operator reads, for example, image data created in advance by a designer or the like by using the image data creating/editing portion 11. Alternatively, the operator creates image data by using the image data creating/editing portion 11. The image data (or, the image data created by the image data creating/editing portion 11) read by the image data creating/editing portion 11 is automatically sent from the image data creating/editing portion 11 to the printer control portion 12.

The printer control portion 12 converts the image data sent from the image data creating/editing portion 11 to create printing data, and sends the created printing data to the printer 4. The printer 4 prints the image 3 on the print medium 2 based on the printing data sent from the printer control portion 12. That is, the printer 4 sequentially stacks one primer ink layer 3a, one color ink layer 3b, and a plurality of the clear ink layers 3c on the print medium 2 based on the printing data.

The image data sent from the image data creating/editing portion 11 to the printer control portion 12 includes thickness information regarding a thickness (height) of the thick portion 3d and shape information regarding a shape of an end portion of the thick portion 3d. The thickness information included in the image data is the number of the clear ink layers 3c constituting the thick portion 3d or a thickness t of the thick portion 3d (refer to FIG. 3). In a case where the thickness information included in the image data is the thickness t of the thick portion 3d, the printer control portion 12 automatically calculates the number of the clear ink layers 3c constituting the thick portion 3d when converting the image data into printing data.

The shape information included in the image data is a shape of an end surface of the thick portion 3d, and based on the shape information, for example, whether the shape of the end surface of the thick portion 3d is a vertical surface (refer to (A) of FIG. 5) orthogonal to a surface of the print medium 2, whether the shape of the end surface of the thick portion 3d is a gentle convex surface (refer to (C) of FIG. 5), or whether the shape of the end surface of the thick portion 3d is an intermediate shape between the vertical surface and the gentle convex surface (refer to (B) of FIG. 5) is specified. The thick portions 3d illustrated in (B) and (C) of FIG. 5 have a dome shape as a whole.

In the embodiment, a spot color is applied to the image data (specifically, image data of the thick portion 3d), and the thickness information and the shape information are specified by the spot color. For example, in a case where a spot color having a spot color name "M_01A" is applied to the image data of the thick portion 3d, it is specified that the thickness t of the thick portion 3d is 1 (mm), and the shape of the end surface of the thick portion 3d is the same as a shape ("M_05A") illustrated in (A) of FIG. 5. For example, in a case where a spot color having a spot color name "M_03B" is applied to the image data of the thick portion 3d, it is specified that the thickness t of the thick portion 3d is 3 (mm) and the shape of the end surface of the thick portion 3d is the same as a shape ("M_05B") illustrated in (B) of FIG. 5, and in a case where a spot color having a spot color name "M_05C" is applied to the image data of the thick portion 3d, it is specified that the thickness t of the thick portion 3d is 5 (mm) and the shape of the end surface of the thick portion 3d is the shape illustrated in (C) of FIG. 5.

Each spot color in which the thickness information, the shape information, and the spot color name are associated (linked) with each other is stored in advance in the image data creating/editing portion 11. Alternatively, when the image data is created and edited by the image data creating/editing portion 11, a spot color in which the thickness information, the shape information, and the spot color name are associated with each other is stored in the image data creating/editing portion 11, and applied to the image data of the thick portion 3d.

In the embodiment, the patch 15 including sample images of a plurality of the thick portions 3d, which are printed by the printer 4 according to each spot color, is created in advance (refer to FIG. 4). For example, the patch 15 includes the sample images of the thick portions 3d, which correspond to the image data to which the spot color of respective spot color names "M_01A" to "M_05A", "M_01B" to "M_05B", and "M_01C" to "M_05C" is applied. The designer or the like who creates the image data applies the spot color to the image data of the thick portion 3d with reference to the patch 15.

In the sample images of five thick portions 3d corresponding to the image data to which the spot color of the respective spot color names "M_01A" to "M_05A" is applied, the shape of the end surface of the thick portion 3d is the same, but the numbers of the clear ink layers 3c constituting the thick portion 3d or the thicknesses t of the thick portions 3d is different. Similarly, in the sample images of five thick portions 3d corresponding to the image data to which the spot color of the respective spot color names "M_01B" to "M_05B" is applied, the shape of the end surfaces of the thick portion 3d is the same, but the numbers of the clear ink layers 3c constituting the thick portion 3d or the thicknesses t of the thick portions 3d is different, and in the sample images of five thick portions 3d corresponding to the image data to which the spot color of the respective spot color names "M_01C" to "M_05C" is applied, the shape of the end surface of the thick portion 3d is the same, but the numbers of the clear ink layers 3c constituting the thick portion 3d or the thicknesses t of the thick portions 3d is different.

Main Effects of Present Embodiment

As described above, in the embodiment, the image data sent from the image data creating/editing portion 11 to the printer control portion 12 includes the thickness information regarding the thickness of the thick portion 3d and the shape information regarding the shape of the end portion of the thick portion 3d. Therefore, in the embodiment, when converting the image data into printing data in the printer control portion 12, the operator does not need to perform the operation of adding the thickness information to the printing data and the operation of adding the shape information to the printing data. Accordingly, in the embodiment, it is possible to reduce the burden of the operator's operation when converting the image data into the printing data.

In the embodiment, a spot color is applied to the image data, and the thickness information and the shape information are specified by the spot color. Therefore, in the embodiment, the thickness information and the shape information can be relatively easily included in the image data.

As described above, the printer control system 5 according to the embodiment has the following configuration.

(1) The printer control system 5 is a system for controlling the inkjet printer 4 that prints the image 3 having a predetermined thickness on the print medium 2. The printer control system 5 includes the image data creating/editing portion 11 for creating and editing image data that is data of the image 3, and the printer control portion 12 for converting the image data sent from the image data creating/editing portion 11 into printing data and sending the printing data to the inkjet printer 4. When a portion for allowing the image 3 to have a thickness in the image 3 having a predetermined thickness is the thick portion 3d, the image data sent from the image data creating/editing portion 11 to the printer control portion 12 includes at least one of: the thickness information regarding the thickness t of the thick portion 3d, and the shape information regarding the shape of the end portion of the thick portion 3d.

In the printer control system 5, the image data sent from the image data creating/editing portion 11 to the printer control portion 12 includes at least one of: the thickness information regarding the thickness of the thick portion 3d, and the shape information regarding the shape of the end portion of the thick portion 3d. Therefore, when converting the image data into printing data in the printer control portion 12, the operator does not need to perform any one of the operation of adding the thickness information to the printing data or the operation of adding the shape information to the printing data. Accordingly, it is possible to reduce the burden of the operator's operation when converting the image data into the printing data.

(2) A spot color is applied to the image data. At least one of the thickness information and the shape information, which are included in the image data, is preferably specified by the spot color. In this configuration, the thickness information and the shape information can be relatively easily included in the image data.

(3) The image data preferably includes both the thickness information and the shape information. In this configuration, it is possible to further reduce the burden of the operator's operation when converting the image data into the printing data.

(4) The thick portion 3d is composed of a plurality of the ink layers 3c that are stacked, and for example, the thickness information is the number of the ink layers 3c constituting the thick portion 3d or the thickness t of the thick portion 3d. For example, the thick portion 3d is composed of the ink layers 3c of the clear ink.

(5) The printer control system 5 can be used in the printing system 1 including the inkjet printer 4 that prints the image 3 on the print medium 2. In the printing system 1, the inkjet printer 4 prints the image 3 on the print medium 2 based on the printing data sent from the printer control portion 12. In the printing system 1, it is possible to reduce the burden of the operator's operation when converting the image data into the printing data.

(6) The printing data creation method according to the embodiment is a printing data creation method for printing the image 3 having a predetermined thickness on the print medium 2, in which when a portion for allowing the image 3 to have a thickness in the image 3 having a predetermined thickness is the thick portion 3d, the printing data is created by converting the image data that is a data of the image 3 including at least one of: the thickness information regarding the thickness of the thick portion 3d, and the shape information regarding the shape of the end portion of the thick portion 3d.

In the printing data creation method, the printing data is created by converting the image data including at least one of: the thickness information regarding the thickness of the thick portion 3d, and the shape information regarding the shape of the end portion of the thick portion 3d. Therefore, when converting the image data into the printing data, the operator does not need to perform any one of the operation of adding the thickness information to the printing data or the operation of adding the shape information to the printing data. Accordingly, when the printing data is created in the printing data creation method of the embodiment, it is possible to reduce the burden of the operator's operation when converting the image data into the printing data.

Another Embodiment

The above-described embodiment is an example of a preferred embodiment of the present invention, but is not limited thereto, and various modifications can be made without changing the gist of the present invention.

In the embodiment described above, any one of the thickness information or the shape information may not be included in the image data sent from the image data creating/editing portion 11 to the printer control portion 12. In this case, the other of the thickness information and the shape information, which are included in the image data, is specified by the spot color. Even in this case, when converting the image data into the printing data in the printer control portion 12, the operator does not need to perform any one of the operation of adding the thickness information to the printing data and the operation of adding the shape information to the printing data. Accordingly, it is possible to reduce the burden of the operator's operation when converting the image data into the printing data.

In the embodiment described above, the primer ink layer 3a, a plurality of the clear ink layers 3c, and the color ink layer 3b may be stacked in this order from the lower side. In the embodiment described above, the thick portion 3d may be composed of a plurality of stacked ink layers of white ink (white ink layers). In this case, the primer ink layer 3a, a plurality of the white ink layers, and the color ink layer 3b are stacked in this order from the lower side.

Modification Example 1

Figure 6:
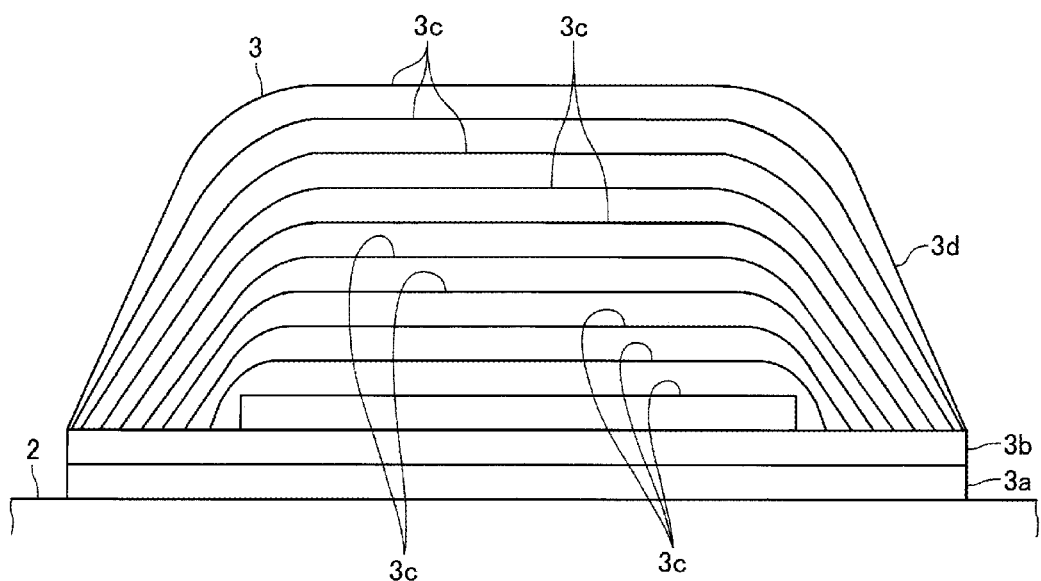
FIG. 6 is a diagram for describing a cross section of an image printed on a print medium by an inkjet printer of a printing system according to Modification example 1.

FIG. 6 is a diagram for describing a cross section of an image 3 printed on a print medium 2 by an inkjet printer 4 of a printing system 1 according to Modification example 1.

Figure 7:
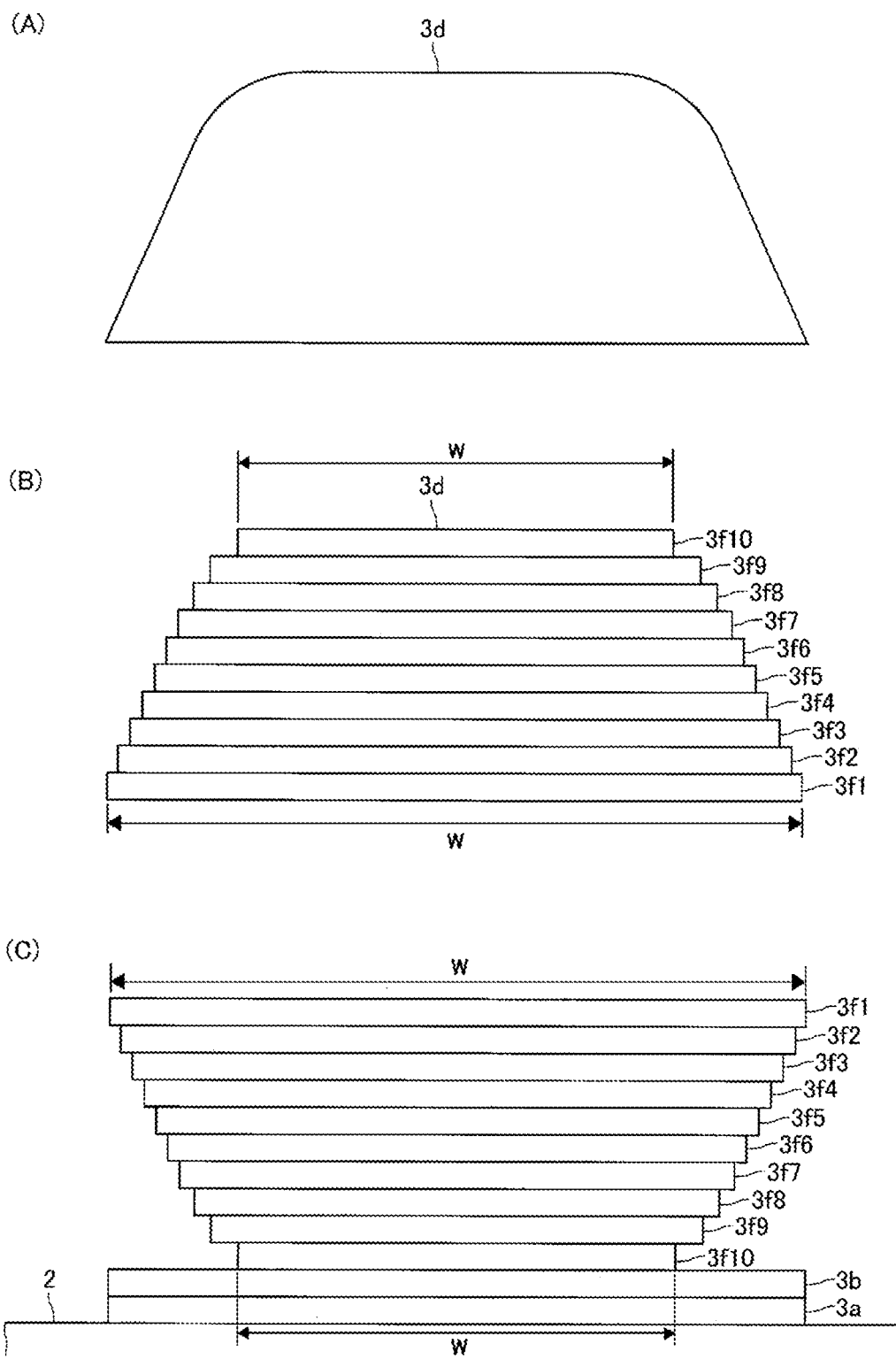
FIG. 7 is a diagram for describing a printing method when an image is printed on a print medium in the printing system according to Modification example 1.

FIG. 7 is a diagram for describing a printing method when the image 3 is printed on the print medium 2 in the printing system 1 according to Modification example 1.

Figure 8:
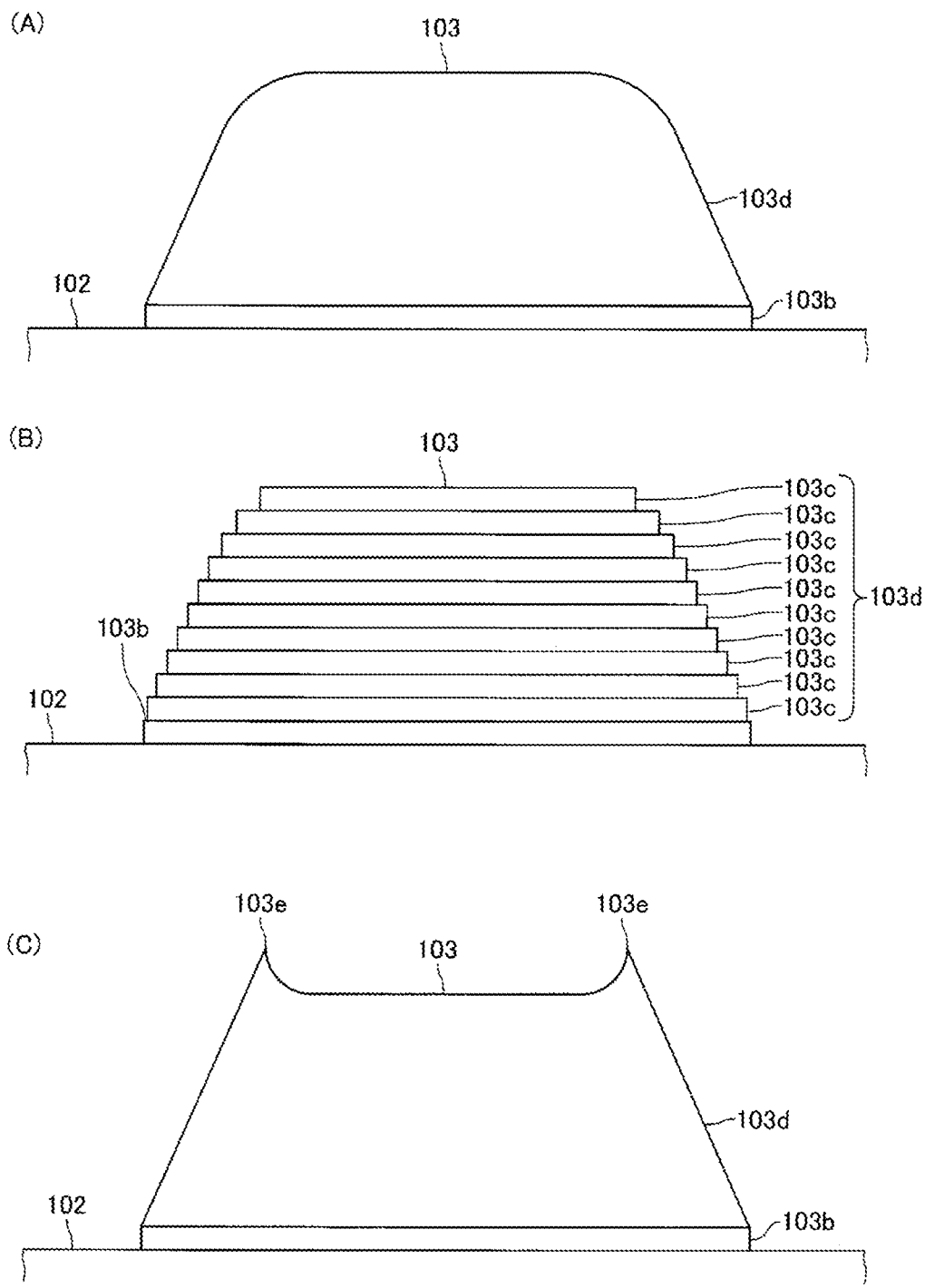
FIG. 8 is a diagram for describing a problem of a conventional technology.

FIG. 8 is a diagram for describing a problem of a conventional technology.

In the embodiment, examples of various shapes of the thick portion 3d (refer to (A) to (C) of FIG. 5) have been described, but for example, as illustrated in (A) of FIG. 8, a shape of a thick portion 103d can be formed so that an end surface of the thick portion 103d of an image 103 is inclined so that a width of the thick portion 103d increases as being directed toward a lower side, and an upper end of the end surface of the thick portion 103d has an R shape.

When the image 103 having the thick portion 103d with such a shape, as illustrated in (B) of FIG. 8, in the conventional example, printing data of a plurality of clear ink layers 103c, which corresponds to a shape of each of a plurality of the clear ink layers 103c constituting the thick portion 103d (refer to (B) of FIG. 5), is created, and each of the clear ink layers 103c is sequentially printed and stacked to form the thick portion 103d by the inkjet printer 4, based on a plurality of the created printing data.

However, as illustrated in (C) of FIG. 8, it has been clarified by a study of the inventor of the present application that when the thick portion 103d is formed by the above-described method, protrusions 103e are formed at the upper end of the end surface of the thick portion 103d, and the upper end of the end surface of the thick portion 103d does not have an R shape. That is, it has been clarified by the study of the inventor of the present application that when the thick portion 103d is formed by the above-described method, the thick portion 103d cannot be formed to have a desired shape. According to the study of the inventor of the present application, it is presumed that the protrusions 103e are generated at the upper end of the end surface of the thick portion 103d when the thick portion 103d is formed by the above-described method due to contraction of the upper surface of the clear ink layer 103c when the clear ink is cured by the ultraviolet light radiated from the ultraviolet irradiating device. Such a problem may also occur when the thick portion 3d is formed to have the shape as illustrated in (B) and (C) of FIG. 5.

Therefore, in the printing system 1 and the printing method according to Modification example 1, it is an object to provide the printing system 1 capable of forming the thick portion 3d to have a desired shape even when the end surface of the thick portion 3d is inclined so that the width of the thick portion 3d increases as being directed toward the lower side and the upper end of the end surface of the thick portion 3d has the R shape.

Since the configuration of the printing system 1 in Modification example 1 is the same as that of the embodiment illustrated in FIG. 1 and FIG. 2, a detailed description thereof will be omitted. Similarly to the embodiment, when the thick printing is performed on the print medium 2 by the inkjet printer 4, the printer control portion 12 converts the image data sent from the image data creating/editing portion 11 to create printing data, and sends the created printing data to the printer 4. The printer control portion 12 causes the printer 4 to print the image 3 based on the printing data. That is, the printer 4 forms the color ink layer 3b on the printer ink layer 3a and forms the thick portion 3d on the color ink layer 3b, based on the printing data. As illustrated in (A) of FIG. 7, the end surface of the thick portion 3d is inclined so that the width in a horizontal direction increases as being directed toward the lower side, and the upper end of the end surface of the thick portion 3d has an R shape and is connected to the upper surface of the thick portion 3d.

As illustrated in (B) of FIG. 7, layers obtained when the thick portion 3d is sliced in the horizontal direction with the same number of layers as the number of the clear ink layers 3c constituting the thick portion 3d are temporary ink layers 3/1 to 3/10. In the embodiment, when the printer 4 prints the image 3 on the print medium 2, the printer control portion 12 creates printing data of a plurality of ink layers for printing each of a plurality of the temporary ink layers 3/1 to 3/10. The printer control portion 12 creates printing data of a plurality of the ink layers automatically or based on the operation of the operator. As in the embodiment, the printing data can be created based on the image data sent from the image data creating/editing portion 11 to the printer control portion 12.

For example, in a case where the thick portion 3d is composed of ten clear ink layers 3c, each of the temporary ink layers 3/1 to 3/10 is a layer obtained when the thick portion 3d is divided into ten layers in a vertical direction, and the temporary ink layers 3/1 to 3/10 are arranged in this order from the lower side to the upper side. Each of the temporary ink layers 3/1 to 3/10 is set to have a dimension corresponding to the shape of the thick portion 3d divided into 10 layers, and is set so that a width W of the temporary ink layers 3/1 to 3/10 in the horizontal direction becomes narrower as being directed from the temporary ink layer 3/1 that is the temporary ink layer of the lowermost layer toward the temporary ink layer 3/10 that is the temporary ink layer of the uppermost layer.

Thus, the printer control portion 12 creates printing data of the temporary ink layers 3/1 to 3/10 formed from the lowermost layer to the uppermost layer according to the shape of the thick portion 3d to be formed. On the other hand, in a case where the temporary ink layers 3/1 to 3/10 are actually printed and stacked on the print medium 2, as illustrated in (C) of FIG. 7, the printer control portion 12 causes the printer 4 to print and stack the temporary ink layers 3/1 to 3/10 in order from the temporary ink layer 3/10 of the uppermost layer to the temporary ink layer 3/1 of the lowermost layer. That is, the printer control portion 12 causes the printer 4 to perform printing in the reverse order of the stacking order of the created printing data.

Specifically, the printer 4 sequentially stacks the temporary ink layers 3/1 to 3/10 on the color ink layer 3b in order of the temporary ink layer 3/10, the temporary ink layer 3/9, the temporary ink layer 3/8, the temporary ink layer 3/7, the temporary ink layer 3/6, the temporary ink layer 3/5, the temporary ink layer 3/4, the temporary ink layer 3/3, the temporary ink layer 3/2, and the temporary ink layer 3/1 based on a plurality of ink layer printing data sent from the printer control portion 12.

Accordingly, the temporary ink layer 3/10 having the narrowest width W in the horizontal direction is stacked on the color ink layer 3b, the width W gradually increases as being directed toward the upper side, and the temporary ink layer 3/1 having the widest width W is stacked on the uppermost side. Therefore, the temporary ink layers 3/10 to 3/1 are stacked on the color ink layer 3b to have the shape of the thick portion 3d turned upside down. However, when the temporary ink layers 3/10 to 3/1 are actually stacked, as illustrated in FIG. 6, opposite end portions of the temporary ink layers 3/1 to 3/9 having a width larger than the temporary ink layer 3/10 of the lowermost layer hang down toward the lower side due to gravity, and are stacked on the color ink layer 3b so as to cover the periphery of the temporary ink layer 3/10 of the lowermost layer. As a result, the end surface of the thick portion 3d is inclined so that the width of the thick portion 3d increases as being directed toward the lower side, and the upper end of the end surface of the thick portion 3d has an R shape. As described above, in a case where the thick portion 3d is formed by the method of Modification example 1, opposite end portions of the temporary ink layers 3/1 to 3/9 hang down toward the lower side so that the upper end of the end surface has the R shape. Therefore, the protrusions 103e as illustrated in (C) of FIG. 8 can be prevented from being generated.

In Modification example 1, width information of each layer in the horizontal direction may also be included in the thickness information included in the image data sent from the image data creating/editing portion 11 to the printer control portion 12. In a case where the thickness information included in the image data is the number of the clear ink layers 3c constituting the thick portion 3d, the width information may include a length of the width W of each layer in the horizontal direction. In a case where the thickness information included in the image data is the thickness t of the thick portion 3d (refer to FIG. 3), information regarding dimensions of the upper end and the lower end of the end surface of the thick portion 3d, and information regarding an inclination angle of the end surface may be included. According to these information, when converting the image data into the printing data, the printer control portion 12 automatically calculates the number of the clear ink layers 3c constituting the thick portion 3d and the width W of each layer in the horizontal direction.

As described above, the printing system 1 according to Modification example 1 has the following configuration.

(7) The thick portion 3d is composed of a plurality of the ink layers 3c that are stacked, and the end surface of the thick portion 3d is inclined so that the width of the thick portion 3d increases as being directed toward the lower side, and the upper end of the end surface of the thick portion 3d has an R shape. In a case where layers obtained when the thick portion 3d is sliced in the horizontal direction with the same number of layers as the number of the ink layers 3c constituting the thick portion 3d are the temporary ink layers 3/1 to 3/10, when the image 3 is printed on the print medium 2 by the inkjet printer 4, the printer control portion 12 creates, as printing data, printing data (a plurality of ink layer printing data) for printing each of a plurality of the temporary ink layers 3/1 to 3/10. The printer control portion 12 causes the inkjet printer 4 to print and stack the temporary ink layers 3/1 to 3/10 in order from the temporary ink layer 3/10 of the uppermost layer to the temporary ink layer 3/1 of the lowermost layer.

As a result, even when the end surface of the thick portion 3d is inclined so that the width of the thick portion 3d increases as being directed toward the lower side and the upper end of the end surface of the thick portion 3d has an R shape, it is possible to prevent the protrusions at the upper end of the end surface of the thick portion 3d from being generated and form the thick portion 3d to have a desired shape.

(8) The temporary ink layers 3/1 to 3/10 are formed so that the width in the horizontal direction becomes narrower as being directed from the temporary ink layer 3/1 of the lowermost layer toward the temporary ink layer 3/10 of the uppermost layer. In this configuration, when the temporary ink layers 3/1 to 3/10 are printed on the print medium 2, opposite end portions of the temporary ink layers 3/2 to 3/10 on the lowermost layer side having a wide width hang down toward the lower side, and are stacked so as to cover the temporary ink layer 3/1 on the uppermost layer side having a narrow width. Therefore, the thick portion 3d can be formed to have a desired shape while preventing the protrusions from being generated.

The printing method of Modification example 2 is a method for printing the image 3 having a predetermined thickness on the print medium 2 according to the printing data created by the printing data creation method described above. In the printing method of the present invention, the thick portion 3d is composed of a plurality of the ink layers 3c that are stacked, and the end surface of the thick portion 3d is inclined so that the width of the thick portion 3d increases as being directed toward the lower side, and the upper end of the end surface of the thick portion 3d has an R shape. In a case where layers obtained when the thick portion 3d is sliced in the horizontal direction with the same number of layers as the number of the ink layers 3c constituting the thick portion 3d are the temporary ink layers 3/1 to 3/10, when the image 3 is printed on the print medium 2, printing data for printing each of a plurality of the temporary ink layers 3/1 to 3/10 is created as printing data, and the inkjet printer 4 prints and stacks the temporary ink layers on the print medium 2 in order from the temporary ink layer 3/10 of the uppermost layer to the temporary ink layer 3/1 of the lowermost layer.

As a result, even when the end surface of the thick portion 3d is inclined so that the width of the thick portion 3d increases as being directed toward the lower side and the upper end of the end surface of the thick portion 3d has an R shape, it is possible to prevent the protrusions at the upper end of the end surface of the thick portion 3d from being generated and form the thick portion 3d to have a desired shape.

Modification example 1 described above is an example of a preferred embodiment of the present invention, but is not limited thereto, and various modifications can be made without changing the gist of the present invention.

In Modification example 1 described above, the primer ink layer 3a, a plurality of the clear ink layers 3c, and the color ink layer 3b may be stacked in this order from the lower side. In the embodiment described above, the thick portion 3d may be composed of a plurality of ink layers of white ink (white ink layers) that are stacked. In this case, the primer ink layer 3a, a plurality of the white ink layers, and the color ink layer 3b are stacked in this order from the lower side. Furthermore, the thick portion 3d in Modification example 1 may be formed in a dome shape as illustrated in (B) and (C) of FIG. 5. Even in this case, according to Modification example 1, it is possible to prevent the protrusions at the upper end of the end surface of the thick portion 3d from being generated and to form the thick portion 3d to have a desired shape.

The invention claimed is:

1. A printer control system for controlling an inkjet printer that prints an image having a predetermined thickness on a print medium, the printer control system comprising:
   an image data creating/editing portion, configured for creating and editing an image data that is a data of the image; and
   a printer control portion, configured for converting the image data sent from the image data creating/editing portion into a printing data and sending the printing data to the inkjet printer,
   wherein in the image having the predetermined thickness, a portion for allowing the image to have a thickness is defined as a thick portion,
   the image data sent from the image data creating/editing portion to the printer control portion includes at least one of:
      a thickness information regarding a thickness of the thick portion, and
      a shape information regarding a shape of an end portion of the thick portion,
   wherein the thick portion is composed of a plurality of ink layers that are stacked, and the thick portion is a protrusion protruded from a periphery of the thick portion.

2. The printer control system as set forth in claim 1, wherein
   a spot color is applied to the image data, and
   at least one of the thickness information and the shape information, which are included in the image data, is specified by the spot color.

3. The printer control system as set forth in claim 1, wherein
   the image data includes both the thickness information and the shape information.

4. The printer control system as set forth in claim 1, wherein
   the thickness information is the number of the ink layers constituting the thick portion or the thickness of the thick portion.

5. The printer control system as set forth in claim 4, wherein
   the thick portion is composed of the ink layers of clear ink or white ink.

6. A printing system comprising:
   the printer control system as set forth in claim 1; and
   the inkjet printer that prints the image on the print medium,
   wherein the inkjet printer prints the image on the print medium based on the printing data sent from the printer control portion.

7. The printing system as set forth in claim 6, wherein an end surface of the thick portion is inclined so that a width of the thick portion increases as being directed toward a lower side, and an upper end of the end surface of the thick portion has an R shape, or the thick portion is formed in a dome shape, and in a case where each layer obtained when the thick portion is sliced in a horizontal direction with the same number of layers as the number of the ink layers constituting the thick portion is a temporary ink layer, when the image is printed on the print medium by the inkjet printer, the printer control portion creates, as the printing data, a plurality of ink layer printing data for printing each of a plurality of the temporary ink layers, and causes the inkjet printer to print and stack the temporary ink layers in order from the temporary ink layer of an uppermost layer to the temporary ink layer of a lowermost layer.

8. The printing system as set forth in claim 7, wherein a width of the temporary ink layer in the horizontal direction becomes narrower as being directed from the temporary ink layer of the lowermost layer to the temporary ink layer of the uppermost layer.

9. The printer control system as set forth in claim 2, wherein
the image data includes both the thickness information and the shape information.

10. The printer control system as set forth in claim 2, wherein
the thickness information is the number of the ink layers constituting the thick portion or the thickness of the thick portion.

11. The printer control system as set forth in claim 10, wherein
the thick portion is composed of the ink layers of clear ink or white ink.

12. The printer control system as set forth in claim 3, wherein
the thickness information is the number of the ink layers constituting the thick portion or the thickness of the thick portion.

13. The printer control system as set forth in claim 12, wherein
the thick portion is composed of the ink layers of clear ink or white ink.

14. A printing data creation method for creating a printing data for printing an image having a predetermined thickness on a print medium, the printing data creation method comprising:

converting an image data to create the printing data, wherein the image data is a data of the image including at least one of: a thickness information regarding a thickness of a thick portion, and a shape information regarding a shape of an end portion of the thick portion, in the image having the predetermined thickness, a portion for allowing the image to have a thickness is defined as the thick portion, wherein a spot color, which is in association with a spot color name, is applied to the image data, and at least one of the thickness information and the shape information, which are included in the image data, is specified by the spot color.

15. A printing method for printing an image having a predetermined thickness on a print medium according to the printing data created by the printing data creation method as set forth in claim 14, wherein the thick portion is composed of a plurality of ink layers that are stacked, an end surface of the thick portion is inclined so that a width of the thick portion increases as being directed toward a lower side, and an upper end of the end surface of the thick portion has an R shape, or the thick portion is formed in a dome shape, the printing method comprising:

in a case where each layer obtained when the thick portion is sliced in a horizontal direction with the same number of layers as the number of the ink layers constituting the thick portion is a temporary ink layer, creating, as the printing data, a plurality of ink layer printing data for printing each of a plurality of the temporary ink layers, and causing an inkjet printer to print and stack the temporary ink layers on the print medium in order from the temporary ink layer of an uppermost layer to the temporary ink layer of a lowermost layer.

* * * * *